Dec. 5, 1967  H. D. STUTZ  3,356,408
CAMPER ANCHORING DEVICE
Filed July 7, 1966  2 Sheets-Sheet 1
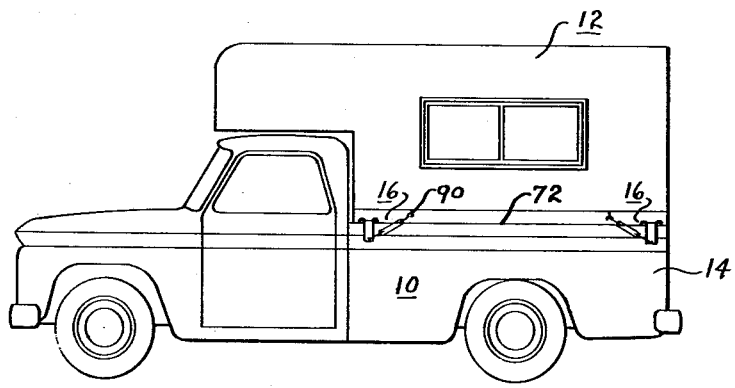
FIG. 1
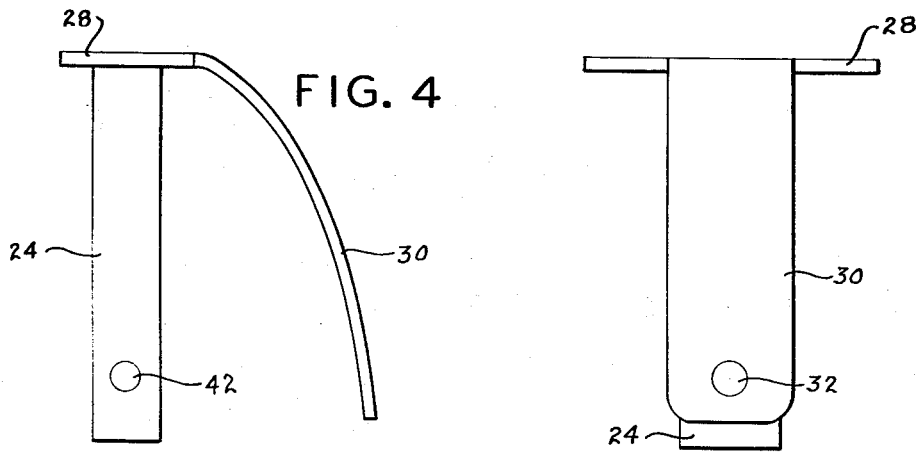
FIG. 4
FIG. 3
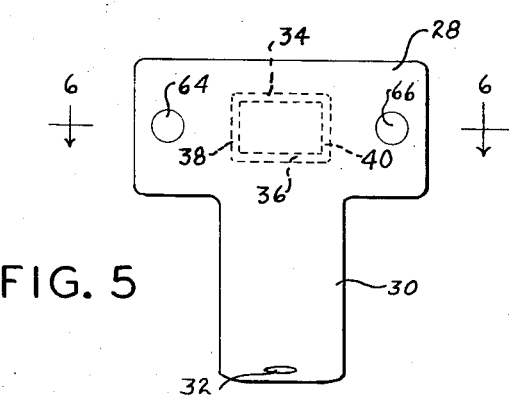
FIG. 5
INVENTOR.
HERBERT D. STUTZ
BY M. A. Hobbs
ATTORNEY INVENTOR.
HERBERT D. STUTZ
BY
M. A. Hobbs
ATTORNEY United States Patent Office 3,356,408
Patented Dec. 5, 1967

3,356,408
CAMPER ANCHORING DEVICE
Herbert D. Stutz, R.R. 5, Elkhart, Ind. 46514
Filed July 7, 1966, Ser. No. 563,478
8 Claims. (Cl. 296—23)

The present invention relates to an anchoring device and more particularly to a device for anchoring a pick-up camper on a pick-up truck bed.

In recent years, pick-up campers have become popular and appear on the market in a variety of different shapes, models and designs. These units are lifted onto the truck bed and anchored to the truck by tie rods or wires or other securing means attached either to the truck bed or to the body of the truck. Anchoring the campers has been a difficult problem, in that tie rods or wires extend over the sides of the truck bed to the lower edge of the truck body, and hence are conspicuous and unsightly, or brackets or fixtures are attached to the bed in locations difficult to reach in mounting the camper on and removing it from the truck, requiring special mountings on and holes in the truck bed or body. Further, some of the fixtures of the more inconspicuous types do not anchor the camper securely, and hence are unsafe while the truck is being driven with the camper, or while the camper is being used on the truck bed. It is therefore one of the principal objects of the present invention to provide a device for anchoring a camper in the bed of a pick-up truck, which utilizes the conventional fixtures on the truck bed used for sideboards, top or superstructure, and which is relatively small and is inconspicuous on the truck when securing the camper in place.

Another object of the invention is to provide an anchoring device for securing a camper on a pick-up truck which is so secured to the truck and camper that it can be easily and conveniently reached to secure the device to the bed and the camper, and which can be readily connected to various makes and models of pick-up trucks without making any changes in the construction and design of the device.

A further object is to provide a relatively simple, easily fabricated anchoring device of the aforesaid type which requires only one design and construction for securing both the front and the rear of the camper in the truck bed, and which can be easily assembled and installed with the use of only a relatively few separate parts.

Additional objects and advantages of the invention will become apparent from the following description and accompanying drawings, wherein:

FIGURE 1 is a side elevational view of a pick-up truck with a camper mounted thereon and secured in place by the present camper anchoring device;

FIGURE 3 is a front elevational view of one part of the anchoring device;

FIGURE 4 is a side elevational view of the part shown in FIGURE 3;

FIGURE 5 is a top plan view of the part shown in FIGURES 3 and 4; and

Figure 6:
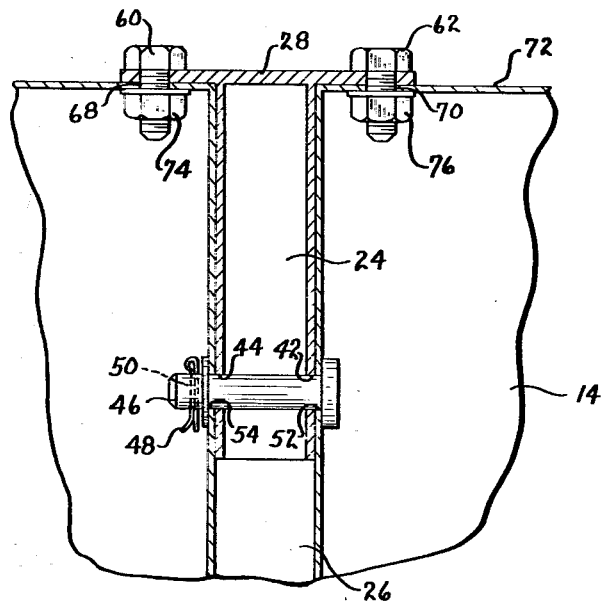
FIGURE 6 is an enlarged, fragmentary vertical cross sectional view of the present device mounted in a fixture on the pick-up truck, the section of the device being taken on line 6—6 of FIGURE 5.

Referring more specifically to the drawings, and to FIGURE 1 in particular, numeral 10 designates a pick-up truck and 12 a camper mounted on the bed 14 of the truck and secured in place by a plurality of the present camper anchoring devices indicated by numeral 16. The present device can be used satisfactorily with various makes and models of pick-up trucks, and with various makes and models of campers, the one shown being merely for the purpose of illustrating the manner in which the present camper anchoring device is used.

The present camper anchoring device consists of an anchor base portion 20 and a tie-down arm 22, the base portion consisting of a post 24, preferably of a rectangular cross section and having external measurements substantially the same size as the opening in the fixture 26 of the pick-up truck bed 14. Secured to the upper edge of the base portion is a cross member 28, having an arm 30 joined integrally thereto and extending downwardly in spaced relation to post 24. Arm 30 is provided with a hole 32 for receiving one end of arm 22. The base portion is constructed of metal, and cross member 28 is welded or otherwise rigidly secured to the upper end of post 24. The post is formed by sidewalls 34 and 36 and endwalls 38 and 40, and the two endwalls are provided with holes 42 and 44, respectively, for receiving a pin 46 or bolt for retaining the post in fixture 26. As shown in the drawings, a pin is used in retaining the post in the fixture and a cotter pin or key 48 extends through a hole 50 in the end of the pin to lock the pin in the fixture, the fixture being provided with a pair of holes 52 and 54 for receiving the pin. The anchor base portion is preferably also secured rigidly in place by bolts 60 and 62 extending downwardly through holes 64 and 66 in cross-member 28 and holes 68 and 70 in the upper edge 72 of the bed of the pick-up truck and retained in place by nuts 74 and 76. Normally, the two holes 68 and 70 are drilled in the upper edge of the bed when the installation is initially made; however, the holes 52 and 54 are provided initially in the fixture for use in retaining posts or bars projecting upwardly for sideboards, a top or other superstructure on the pick-up truck bed. Arm 22 consists of members 80 and 82 having hooked ends 84 and 86, respectively, the members being threaded into opposite ends of turnbuckle 88. Hooked end 84 engages arm 30 of the base member by extending through hole 32, and hooked end 86 engages an eye 90 in the side of the pick-up camper.

Figure 2:
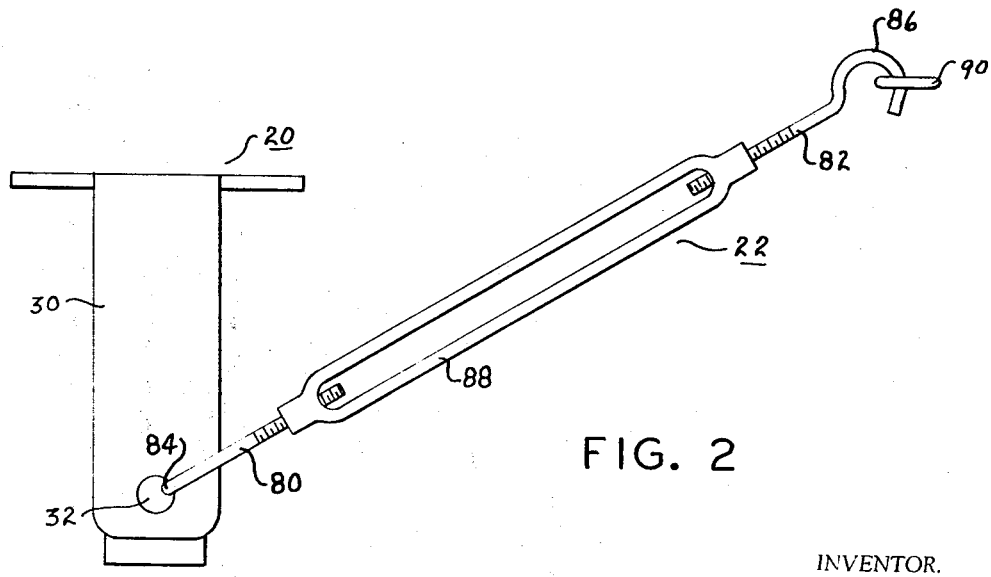
FIGURE 2 is an enlarged front elevational view of the present camper anchoring device.

In installing the present camper anchoring device on a pick-up truck having four fixtures 26, post 24 of each anchoring device is slipped downwardly into the respective fixtures 26 and pins 46 are placed through the fixtures and posts. Bolts 60 and 62 are then secured in place and arm 22 is connected to arm 30 in the manner illustrated in FIGURES 1 and 2 with hooked end 84 extending through hole 32 and hooked end 86 extending through eye 90 secured to the side of the camper.

After the anchoring devices have been assembled in the fixtures 26 in the foregoing manner, the camper is then placed on the truck bed in the position illustrated in FIGURE 1, arms 22 are installed and each turnbuckle 88 is rotated to tighten the device and secure the camper firmly in place on the bed where it will remain until the anchoring device is released by releasing the turnbuckle.

Arm 30 is preferably made of spring steel so that it will spring slightly when the turnbuckle is tightened and thereby firmly retain the camper in place regardless of vibration, jostling, or road jarring. In some installations the post may be eliminated and member 28 secured directly to the upper edge of the bed side by bolts or other suitable securing means. While one embodiment of the present camper anchoring device and several modifications thereof have been described in detail herein, various changes and further modifications may be made without departing from the scope of the invention.

I claim:
1. A camper anchoring device and a pick-up truck having a bed with sides and a plurality of fixtures in said sides, each fixture having a vertical hole therein, said device comprising a post for seating in the fixture hole, an arm connected to the upper end of the post and extending outwardly from the bed side and downwardly along the side thereof, a means for retaining said post in the hole in the fixture, and an adjustable arm means secured to the lower end of said arm and adapted to be attached to the camper on the truck bed.

2. A camper anchoring device as defined in claim 1, in which a cross member is secured to the top of the post and extends therefrom on opposite sides in the longitudinal direction of the sides of the truck bed, and means for securing said cross member to the truck bed.

3. A camper anchoring device as defined in claim 1, in which said arm is arcuate shaped.

4. A camper anchoring device as defined in claim 1, in which said post is rectangular in cross section.

5. A camper anchoring device as defined in claim 1, in which the means for retaining the post in the hole in the fixture consists of a pin extending transversely through the fixture and post.

6. A camper anchoring device as defined in claim 1, in which said adjustable arm means consists of a pair of threaded members with hooked ends, one for engaging the lower end of said downwardly extending arm and the other for engaging an anchoring means on the camper, and a turnbuckle between said members for varying the length of said arm means to secure the camper in place on the truck bed.

7. A camper anchoring device as defined in claim 2, in which said adjustable arm means consists of a pair of threaded members with hooked ends, one for engaging the lower end of said arm and the other for engaging an anchoring means on the camper, and a turnbuckle between said members for varying the length of said arm means to secure the camper in place on the truck bed.

8. A camper anchoring device as defined in claim 4, in which said adjustable arm means consists of a pair of threaded members with hooked ends, one for engaging the lower end of said arm and the other for engaging an anchoring means on the camper, and a turnbuckle between said members for varying the length of said arm means to secure the camper in place on the truck bed.

References Cited
UNITED STATES PATENTS

| | | | |
|---|---|---|---|
| 3,102,708 | 9/1963 | Crain | 248—361 |
| 3,248,083 | 4/1966 | De Gennaro | 296—23 |
| 1,325,353 | 12/1919 | Day | 296—35.1 |
| 2,173,076 | 9/1939 | Stetson | 296—23 |

LEO FRIAGLIA, *Primary Examiner.*

P. GOODMAN, *Assistant Examiner.*